United States Patent [19]
Lehr

[11] Patent Number: 5,777,622
[45] Date of Patent: Jul. 7, 1998

[54] METHOD FOR IDENTIFYING INVISIBLE OBJECTS ORDERED IN A TREE-LIKE DATA STRUCTURE BY FINDING ADJOINING HIDDEN OBJECTS

[75] Inventor: Theodore Franklin Lehr, Austin, Tex.

[73] Assignee: International Business Machines Corporation, Armonk, N.Y.

[21] Appl. No.: 583,347

[22] Filed: Jan. 5, 1996

[51] Int. Cl.$^6$ .................................................. G06T 11/20
[52] U.S. Cl. .................................................. 345/428
[58] Field of Search ........................ 395/119, 120, 395/121, 122, 126–130, 139; 345/419–430

[56] References Cited

U.S. PATENT DOCUMENTS

| | | | |
|---|---|---|---|
| 4,694,407 | 9/1987 | Odgen | 345/441 |
| 5,123,084 | 6/1992 | Prevost et al. | 345/420 |
| 5,341,466 | 8/1994 | Perlin et al. | 345/439 |
| 5,497,453 | 3/1996 | Megahed et al. | 345/422 |
| 5,566,251 | 10/1996 | Hanna et al. | 382/284 |
| 5,627,915 | 5/1997 | Rosser et al. | 382/219 |

OTHER PUBLICATIONS

Sillion et al., Feature Based Control of Visibility Error: A Multiresolution Clustering Algorithm for Global Illumination, Computer Graphics, pp. 145–152, Jul. 1995.

Teller et al., Global Visibility Algorithms for Illumination Computation, Computer Graphics, pp. 239–246, Jul. 1993.

Eck et al., Multiresolution Analysis of Arbitrary Meshes, Computer Graphics, pp. 173–182, Jul. 1995.

Meer et al., Multiresolution Adaptive Image Smoothing, Graphical Models and Image Processing, pp. 140–148, Mar. 1994.

*Primary Examiner*—Anton Fetting
*Attorney, Agent, or Firm*—Sawyer & Associates; Mark S. Walker

[57] ABSTRACT

A method for identifying invisible objects that are ordered in a tree-like data structure in which a drawing program displays object data on a display device and a user selects a viewing area of the object data to be drawn. Each of the objects includes a size that is determined by a first-edge value and a second-edge value. The method comprises the steps of finding a maximum second-edge value among a group of objects that includes a first object and descendant objects of the first object. A viewing resolution is determined from the viewing area, and each of the objects in the viewing area are then drawn on the display. If the first object is invisible at the current viewing resolution, then the maximum second-edge value is used to calculate whether any of the descendant objects are also visible at the viewing resolution. If none of the descendant objects are visible, then the method determines if there are more objects to be drawn within the viewing area, thereby eliminating the need to check the size of each of the descendant objects.

16 Claims, 7 Drawing Sheets

| PARENT POINTER | 48 |
| DESCENDANT POINTER | 50 |
| LEFT-SIBLING POINTER | 52 |
| RIGHT-SIBLING POINTER | 54 |
| DEPTH FIELD | 56 |
| LEFT-EDGE FIELD | 58 |
| RIGHT-EDGE FIELD | 60 |
| DESCENDANT FLAG | 62 |
| WITHIN-VIEWING-AREA FLAG | 64 |
| RIGHT-MOST-EDGE FIELD | 66 |

METHOD FOR IDENTIFYING INVISIBLE OBJECTS ORDERED IN A TREE-LIKE DATA STRUCTURE BY FINDING ADJOINING HIDDEN OBJECTS

FIELD OF THE INVENTION

The present invention relates to software visualization tools and more particularly to a method for identifying invisible objects ordered in a tree-like data structure by finding adjoining hidden objects.

BACKGROUND OF THE INVENTION

Many types of visualization software applications are in existence today. Examples of such applications include performance CAD tools and scientific data visualization tools. CAD tools are capable of displaying graphic data, such as digitized maps, for example.

One type of scientific visualization tool displays software or hardware traces that are recordings of a chronology of events or states that occur during software execution. Trace chronologies are used in performance analysis and debugging. Events in trace chronologies are often paired, forming event-pairs. Examples of events that are paired in this manner are the start and end times of programs, functions, and system calls.

Trace chronologies are more effectively utilized when event-pairs are displayed graphically along a time-line. A Ghant chart, also known as a bar chart or histogram is a common format for displaying trace chronologies. In a Ghant chart, rectangles of various lengths that represent different even-pairs, are arranged chronologically along a time axis. State-of-the-art trace visualization tools permit event-pair nesting and represent nested event-pairs by displaying adjacent or overlapping rectangles in a complex Ghant chart.

Both scientific visualization tools and CAD tools display what may have been thousands of pages of information on one screen in an interactive manner that allows a user to see an overview of all the information as well as a magnified view of smaller sections. The data, whether traces or map data, are organized into data structures that may contain thousands or even millions of objects. Some visualization tools organize data objects into a tree-like data structure, where each object is node in the tree, and the objects are linked together in complex relationships. Through the use of the tree-like data structure, all the data objects are available to a user to zoom-in on by selecting a viewing area. In the case of trace chronologies, the user selects a viewing area by selecting a start-time and an end-time. In the case of a CAD tool, the user selects viewing area by drawing a box on the map with a mouse or clicking on zoom-in and zoom-out buttons.

Regardless of the type of application, the data objects stored in tree-like data structure are often radically different sizes. For example, in the case of an aeronautic CAD application, a wing strut is much larger than a screw. The visualization tool, however, may be requested to draw these objects together on a computer display. When drawing objects at low resolutions, relatively small objects, such as the screw, are too small to be seen and are therefore invisible.

One problem faced by the applications is how to quickly identify the large number of objects in the tree-like data structure that are too small to draw or hidden by other objects. For each object located in the viewing area, conventional visualization applications test the object and all of the object's descendants in the tree-like data structure for visibility. In a large tree-like data structure, a particular object may have hundreds or thousands of descendants depending on what level the object occupies in the tree. Testing each object and all its descendants for its visibility is time intensive and takes away computing time for drawing visible objects.

Accordingly, what is needed is a method for reducing the time spent testing the size of objects for visibility to increase the drawing speed of visualization applications. The present invention addresses such a need.

SUMMARY OF THE INVENTION

The present invention provides a method for identifying invisible objects ordered in a tree-like data structure in which a drawing program displays object data on a display device and a user selects a viewing area of the object data to be drawn. Each of the objects includes a size that is determined by a first-edge value and a second-edge value. The method comprises the steps of finding a maximum second-edge value among a group of objects that includes a first object and descendant objects of the first object. A viewing resolution is determined from the viewing area, and each of the objects in the viewing area are then drawn on the display. If the first object is invisible at the current viewing resolution, then the maximum second-edge value is used to calculate whether any of the descendant objects are also visible at the viewing resolution. If none of the descendant objects are visible, then the method determines if there are more objects to be drawn within the viewing area, thereby eliminating the need to check the size of each of the descendant objects.

According to the system and method disclosed herein, the present invention increases the drawing speed of visualization tools that operate on tree-like data structures.

DESCRIPTION OF THE INVENTION

The present invention relates to an improvement in drawing data objects ordered in a tree-like structure. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
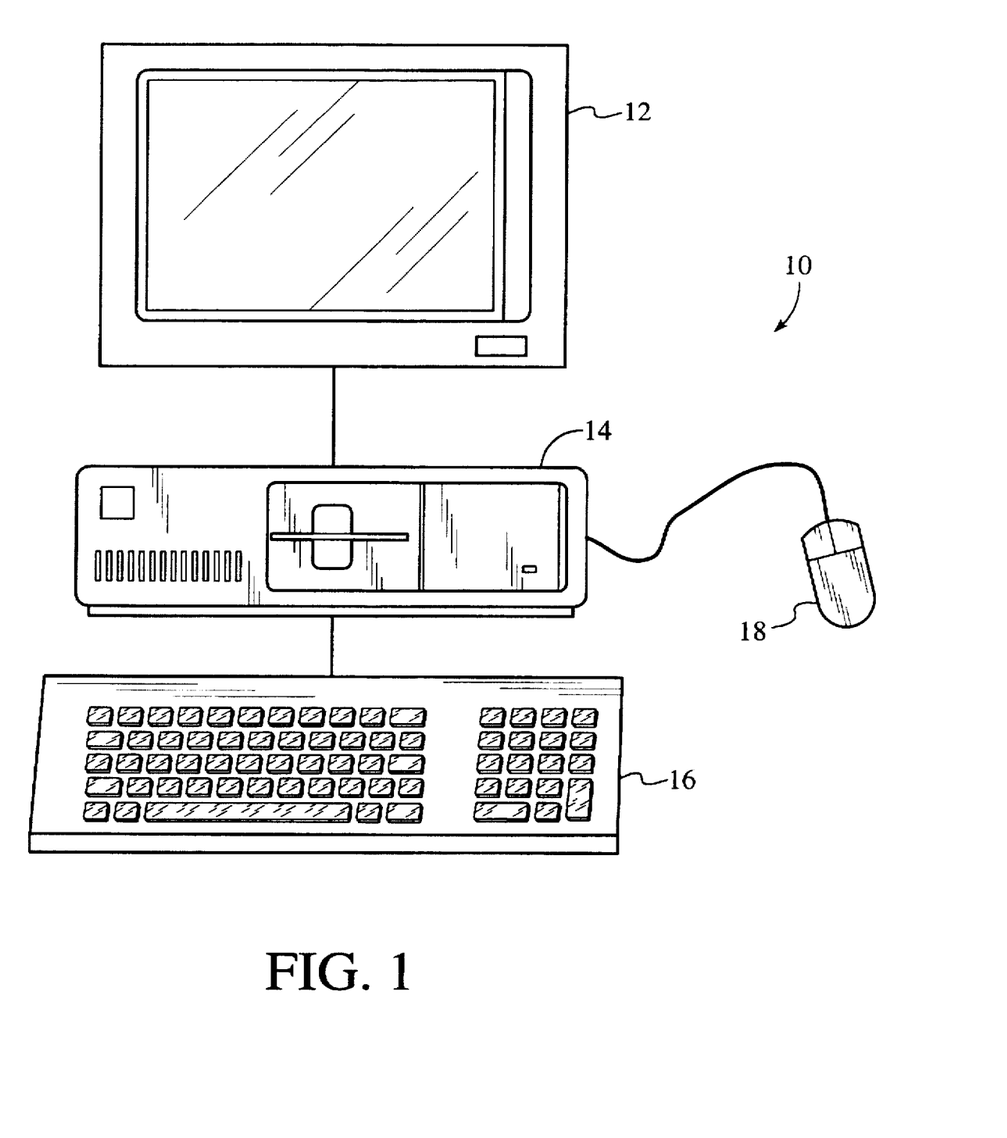
FIG. 1 is a block diagram illustrating a computer system that is capable of executing visualization software applications.

FIG. 1 is a block diagram illustrating a computer system 10 that is capable of executing visualization software applications. The computer system 10 comprises display device 12, processor 14, keyboard 16, and mouse 18. Tracing data is received and processed within processor 14. Data output from a visualization tool, such as trace chronologies or map data, for instance, are then displayed graphically within display device 12. A user may determine the portion of the data displayed within display device 12 using keyboard 16 or mouse 18.

Figure 2:
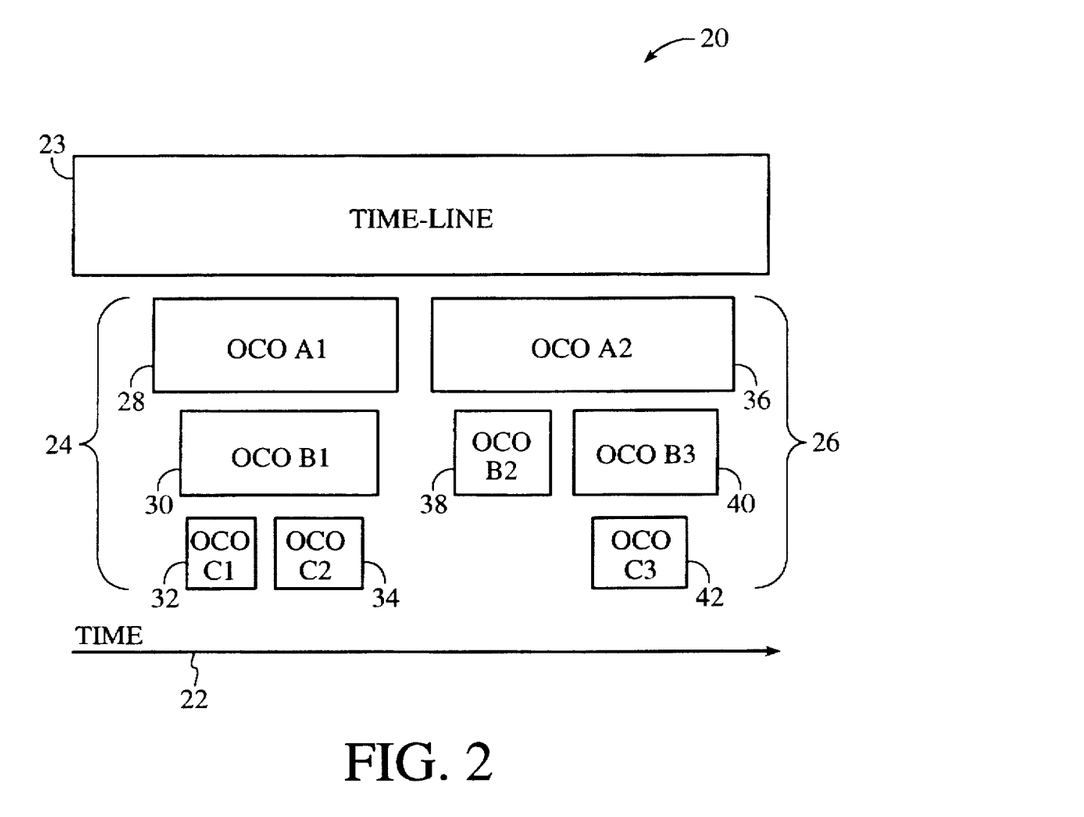
FIG. 2 is diagram illustrating example trace chronology data that is output by a visualization tool and displayed in a window within a display device.

FIG. 2 is diagram illustrating example trace chronology data that is output by a visualization tool and displayed in a window 20 within display device 12. The window 20 includes a time axis 22 and conventional scroll buttons (not shown) for selecting which portion of the trace chronology corresponding to the process 23 (time-line-1) is displayed within the window 20.

Along the time axis 22, sets of event pairs 24 and 26 are displayed. Set 24 comprises synchronously nested event-pairs 28, 30, 32, and 34. Set 26 comprises synchronously nested event-pairs 36, 38, 40, and 42.

Figure 3:
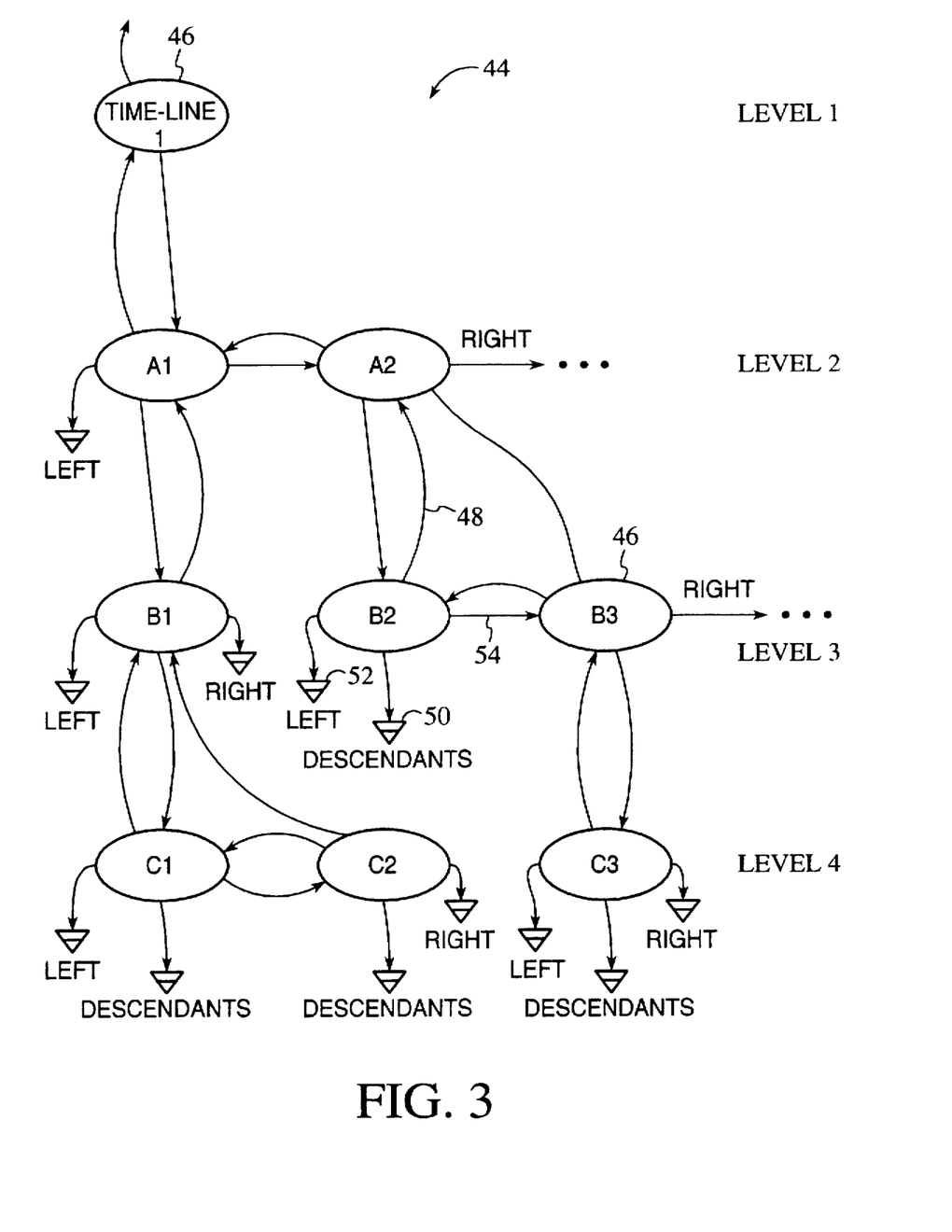
FIG. 3 is a graph depicting an sample tree-like structure for ordering objects for visualization tools.

FIG. 3 is a graph depicting an sample tree-like structure 44 (hereinafter referred to as tree) in which objects are ordered for visualization tools. As shown, the objects 46 in the tree 44 represent the trace chronology event-pairs shown in FIG. 2. Besides event-pairs, the objects 46 in the tree 44 may also represent physical entities, such as items on a map, for example.

Each object 46 in the tree is located on a particular level of the tree 44, and the objects 46 are stored in the tree 44 in various relationships. An object 46 may have a one parent and one or more children. The parent is the object 46 to which the current object 46 is connected to in the level immediately above, while a child is the object 46 to which the current object 46 is connected to in the level immediately below. Any child object, grandchildren, and so on are called descendants of the current object 46. Objects 46 that have no children terminate the branches of the tree 44 and are called leaves.

Figure 4:
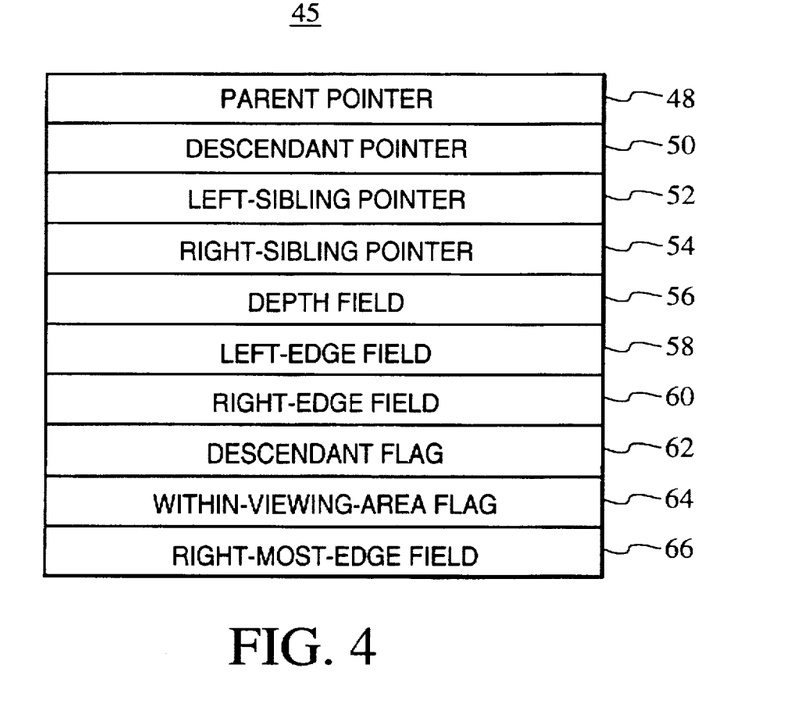
FIG. 4 is a diagram illustrating a data structure that is used to represent a data object.

Referring now to FIG. 4, a diagram illustrating a data structure used to represent an object 46 is shown. The data structure 44 includes several fields that store information about the object 46. Four pointer fields, a parent pointer 48, a descendant pointer 50, left-sibling pointer 52, and right-sibling pointer 54, are used to point to the parent, descendants, left-sibling, and right-sibling, respectively. For example, referring to FIGS. 2–4, the parent pointer 48 for object B2 points to object A2, and the right-sibling pointer 54 for B2 points to B3. Since B2 has no children or left-sibling, its descendant pointer 50 and left-sibling pointer 52 are null.

The data structure 44 for an object 46 may also include: a) a depth field 56 indicating the level of the tree 44 occupied; b) a left-edge field 58 that defines the start of the object; c) a right-edge field 60 that defines the end of the object; d) a descendant flag 62 indicating whether the current object 46 has any descendants; e) a within-viewing-area flag 64 that is set after an object 46 is found to be within the viewing area selected by the user; and f) a right-most-edge field 66, which is explained further below.

In the preferred embodiment where the objects 46 in the tree 44 represent event-pairs in a computer trace application, the left and right-edge fields 56 and 58 store the start and end times of the event pair, respectively. In the preferred embodiment where the objects 46 represent physical entities, the left and right-edge fields 56 and 58 store the left and right (x, y) coordinates of the entity in 2-D applications, and the left and right (x, y, z) coordinates of the entity in 3-D applications.

Figure 5:
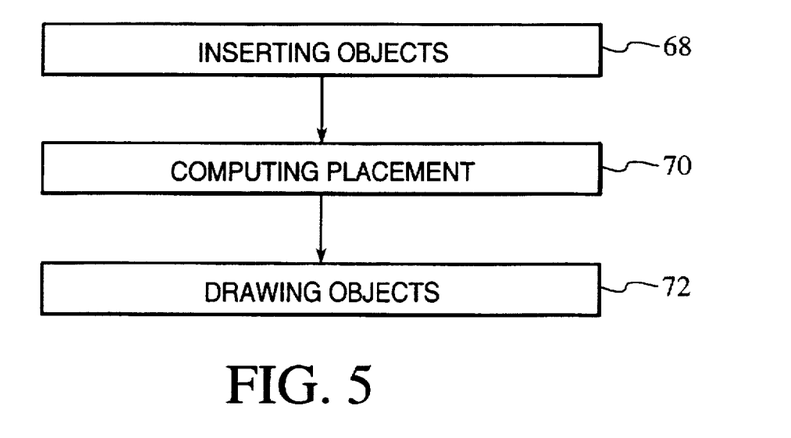
FIG. 5 is a block diagram illustrating a high-level view of the processes that must be performed before data can be displayed by a visualization tool.

FIG. 5 is a block diagram illustrating a high-level view of the processes that must be performed before data can be displayed by a visualization tool. The processes include inserting objects 68, computing placement 70, and drawing 72.

The process of inserting objects 68 is a process whereby raw data is read an ordered into the tree 44. In a preferred embodiment, the data must be organized into the tree 44 before the visualization tool can process the data. However, in another preferred embodiment, the visualization tool may have the capability to insert raw data into a tree prior to processing. As described below, the drawing process 72 has been improved to include the process of finding adjoining hidden objects in accordance with the present invention.

As stated above, a user may interact with the visualization tool by selecting a viewing area. After the user defines the viewing area over the data, the process of computing placement 70 computes which objects in the tree 44 fall within the boundary of viewing area. Specifically, the process determines whether an object fully or partially falls within the coordinates of the viewing area.

In a preferred embodiment, this determination begins with objects along the left boundary of the viewing area. When an object is found that is within the viewing area, the object's within-viewing-area flag 64 is set. Afterwards, the object's descendants, right siblings, and right uncles are checked until an object is found that crosses the right border of the viewing area. When an object is found that is too-far-right, the process begins again on the left boundary.

In an alternative embodiment, not only are the objects found within the viewing area flagged, but also objects predicted to be viewed next by the user. This process incorporates the principle of locality of reference, whereby the viewing area is used to predict what area of the data the user will attempt to view next.

After it is determined which objects are within the viewing area boundary, the drawing process 72 is used to draw each of the objects. Not all the objects within the viewing area will be drawn, however.

Recall that one problem faced by the tools is how to quickly identify the large number of objects in the tree 44 that are too small to draw given the current resolution, or that are hidden by other objects. Conventional visualization applications typically test all descendants of a given invisible object on an individual basis, which is time consuming.

The present invention solves the problem of identifying invisible objects in a tree 44 without testing the size of every object. Instead, the present invention uses a property of the tree 44 that as the logical distance between an object and the leaf of the tree 44 diminishes, the size of the object is likely to diminish. In other words, objects closer in distance to the leaves are likely to be smaller than those which are less close. Therefore, given any invisible object, it is often the case that there are many other invisible objects in the same vicinity of the tree 44.

It is important to note that not all objects located deeper in the tree 44 between a given invisible object and the leaves of the tree 44 are necessarily invisible. Such a property holds in performance trace visualization tools and in some CAD and scientific visualization tools. However, the present invention makes a probablistic assumption about the sizes of the objects in the tree 44, not a deterministic one.

To implement the above probablistic assumption, knowledge is provided in each object regarding whether a descendant object exits that is larger than the current object. When objects are inserted into the tree 44, the insertion process 68 finds the maximum right-edge value between a newly inserted object and all of the object's descendants. In a preferred embodiment, once the maximum value is found, it is stored in the right-most-edge field 66 in the data structure 44 corresponding to the newly inserted object.

The unit of the maximum right-edge value is absolute and independent of the resolution of the screen. After the tree is formed and the drawing process 72 attempts to draw an invisible object, the object's right-most-edge field 66 is checked to determine whether an object large enough to draw is located beneath the object. If not, then it is assumed all of the object's descendants are also invisible. Assuming that all of an invisible object's descendants are invisible allows the drawing process 72 to eliminate the need to check the size of all of the descendants of the invisible object, as explained further below.

Whether an object is visible or not depends on the size of the object and the current resolution or granularity determined by the viewing area. As the user zooms-out, the granularity becomes larger, as the user zooms-in, the granularity becomes smaller. In the case of computer traces, the minimum granularity is the minimum traceable time possible, such as one micro-second, for instance.

The visibility of an object also depends on the minimum and maximum granularity allowed by the application. For example, assume that in a map application, the minimum granularity is ten miles. If an object is less than ten miles wide, then the object is invisible no matter how close the user zooms-in.

Not only the is the location of each object important to determine visibility, but also the order in which they are drawn. For example, when drawing a persons' face, drawing the nose before the face will result in a final image of a face without a nose since the face is drawn on top of the nose. Therefore, in the preferred embodiment, as each object within the viewing area is input to the drawing process 72, the tree 44 is traversed depth first then left-to-right so that descendants are drawn before siblings. This ensures that in the case of trace chronologies, traces that started first are drawn first.

Figure 6A:
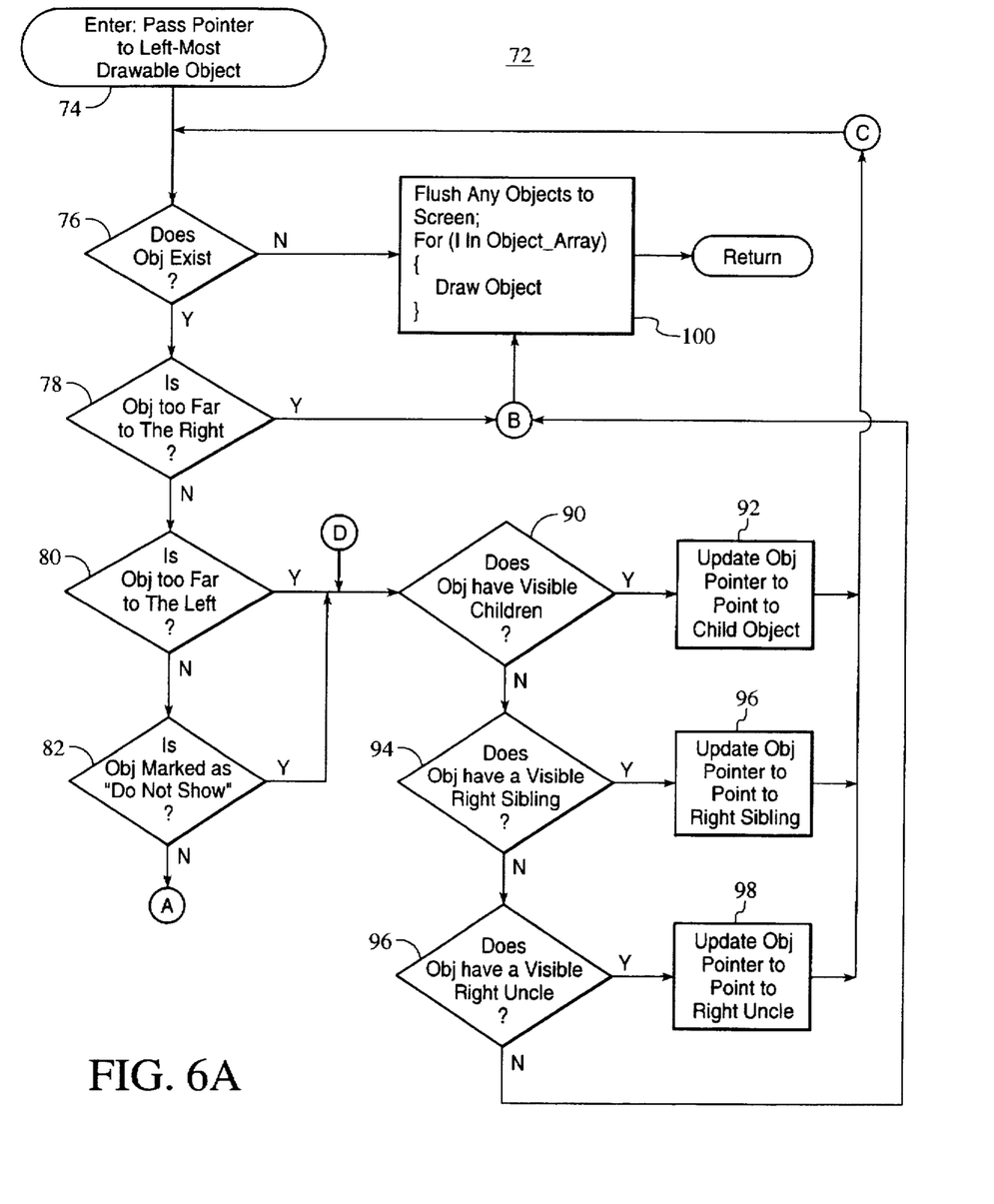
FIGS. 6A and 6B depict a flow chart of the steps taken during a drawing process in accordance with a preferred embodiment of the present invention.
Figure 6B:
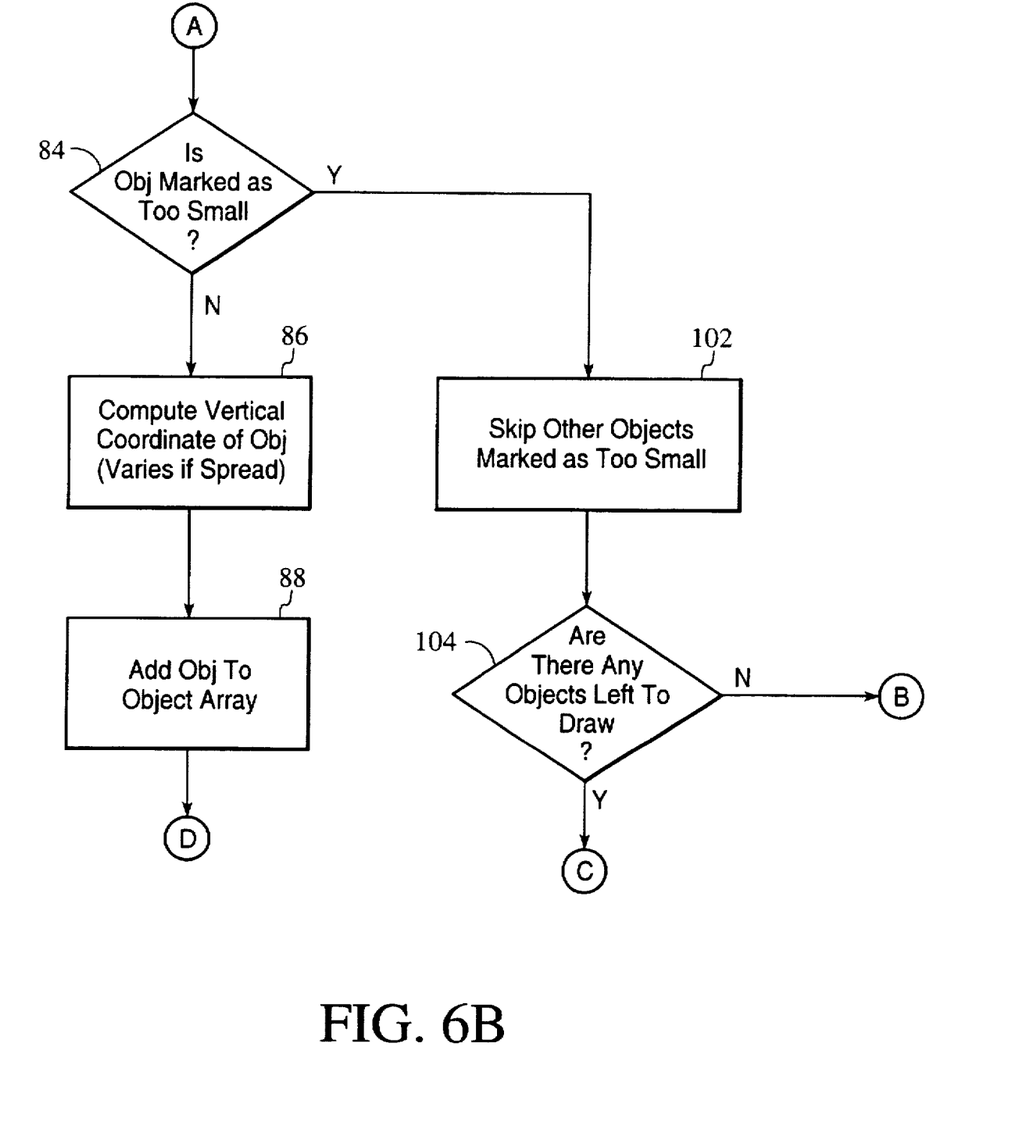

FIGS. 6A and 6B depict a flow chart of the steps taken during a drawing process 72 in accordance with a preferred embodiment of the present invention. A pointer to a leftmost drawable object found in the viewing area is passed to the drawing process in step 74. If the object exists in step 76, and is not too far to the right of the viewing area in step 78, and is not to far to the left of the viewing area in step 80, and is not marked as "do not show" in step 82, then it is determined whether the object is too small to be drawn in step 84, shown in FIG. 6B.

An object is visible and therefore drawn when the size of the object is greater than the minimum granularity. An object is invisible and therefore too small to be drawn when the size of the object is less than the minimum granularity. If the object is not too small to be drawn, then the vertical coordinate of object is computed in the case of trace chronologies in step 86. The object is then added to an array of drawable objects in step 88.

If an object has been added to the array of drawable objects in step 88, or is too far to the left in step 80, or is marked as "do not show" in step 82, then the process proceeds to step 90. If the object has visible children, then the object pointer is updated to point to the child of the object in step 92, and the process proceeds to step 76 to begin again. If the object does not have visible children, then it is determined if the object has a visible right sibling in step 94.

If the object has a visible right sibling, then the object pointer is updated to point to the right sibling of the object in step 96, and the process proceeds to step 76. If the object does not have a visible right sibling, then it is determined if the object has a visible right uncle in step 98.

If the object has a visible right uncle, the object pointer is updated to point to the right uncle of the object, and the process proceeds to step 76. If the object does not have a visible right uncle, then the process proceeds to step 100, in which the array of drawable objects is drawn.

Note that objects can only be drawn if they are added to the array in step 88. The objects in the array are also drawn if an object is encountered that either does not exist in step 76 (indicating no more data), or is too far right in step 78 (indicating that the right edge of the viewing area has been passed).

Referring again to step 84, when a given object has been determined to be invisible, a conventional drawing process examines the visibility of every object in the tree located between the invisible object and the leaves of the tree 44.

In contrast to conventional methods, when an invisible object is encountered, the process of finding adjoining hidden objects is performed in step 102 in accordance with the present invention to locate other invisible objects in the same vicinity. This allows the drawing process to skip over all the objects located below the current object that are too small to draw.

After the process of finding adjoining hidden objects is performed, it is determined if there are more objects to be drawn within the viewing area in step 104. If there are more drawable objects, then the pointer is updated to the next object and the process proceeds to step 76. If there are no more drawable objects, then the objects that are stored in the array are drawn in step 100, and the drawing process 72 ends.

Figure 7:
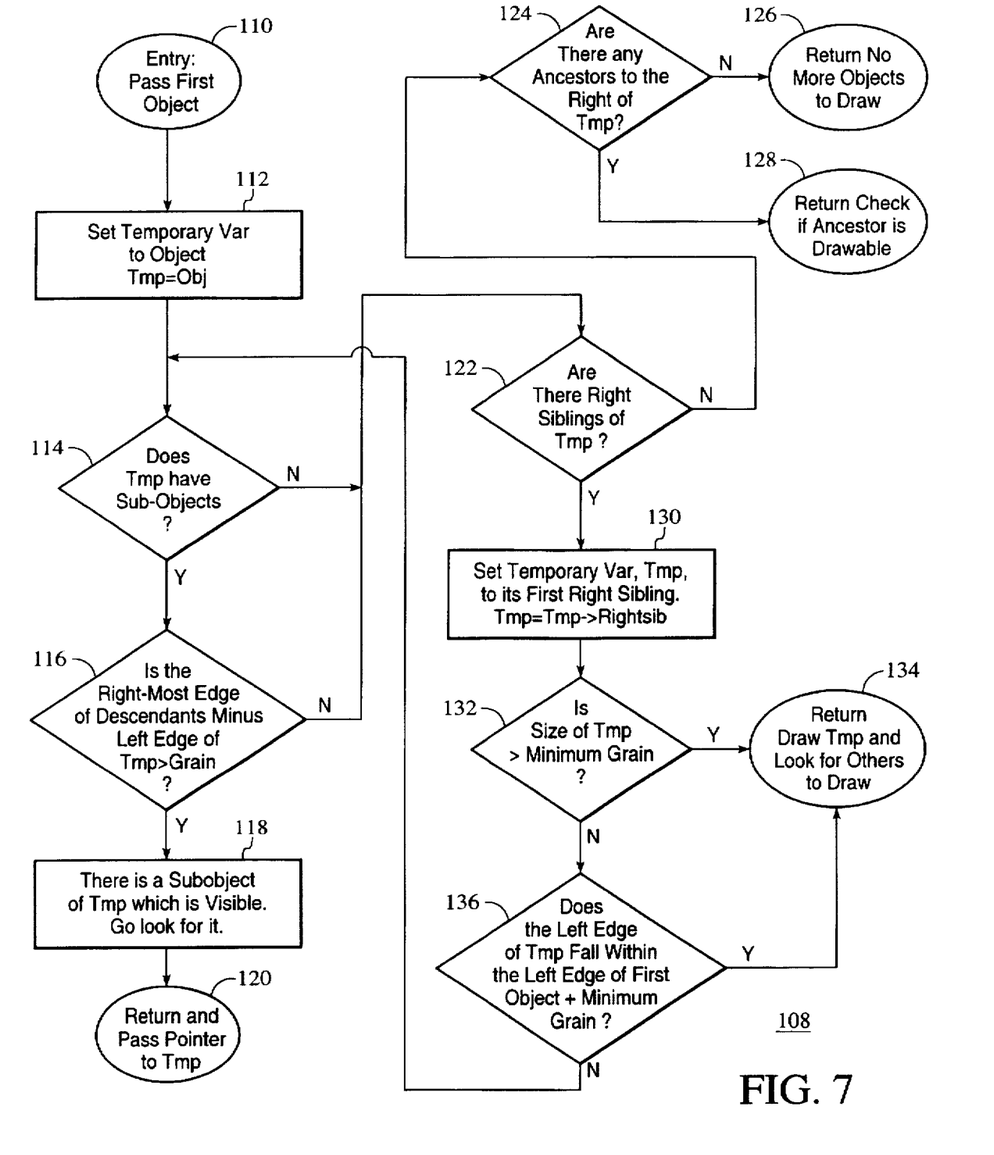
FIG. 7 is a flow chart showing the step performed during the process of finding adjoining hidden objects in accordance with the present invention.

FIG. 7 is a flow chart showing the steps performed during the process of finding adjoining hidden objects 108 in accordance with the present invention. The process begins in step 110 when a given invisible object is passed to the process as input. After an invisible object is received, the process proceeds to step 112 where the values of the object are stored in a temporary variable (tmp). It is then determined if the invisible object stored in tmp has any descendants in step 114.

If tmp does have descendants, then it determined if there is a descendant of tmp that is larger than tmp and visible at the current resolution in step 116. This is done by checking the object's right-most-edge field 66 to determine whether an object large enough to draw is located beneath the current invisible object. A descendant of tmp is visible when the value of the right-most edge field minus the left-edge of tmp is greater than the grain. Thus, the calculation will indicate if an object exists below tmp that is partially obscured by tmp, but is still large enough to be visible at the current resolution.

If the value of right-most edge field 66 minus the left edge of tmp is greater than the grain, then there is a visible object below tmp in step 118, and the process returns to the drawing process 72 where the object is drawn in step 120.

If the value of right-most edge field 66 minus the left edge of tmp is not greater than the grain, then there is no visible object below tmp and it is determined whether there are any right siblings of tmp in the tree in step 122.

If there are no right siblings of tmp in the tree, then it is determined whether there are ancestors of tmp that are located to the right of tmp in the tree in step 124. If a right ancestor of tmp exists, then the process returns to the drawing process 72 to check the visibility of the ancestor in step 128. If an ancestor for tmp does not exist, then there are no more objects to draw in the vicinity of tmp and the process returns to the drawing process in step 126.

If tmp does have right siblings in step 122, then tmp is set to equal tmp's first right sibling in step 130. It is then determined whether the size of tmp is greater than the minimum granularity in step 132. If the size of tmp is greater than the current minimum granularity then the process returns to the drawing process 72 where the object is drawn in step 134.

If the size of tmp is not greater than the minimum granularity, then it is determined whether the left-edge of tmp falls within the left-edge of tmp's parent plus the minimum grain in step 136. If the left-edge of top falls within the left edge of tmp's parent plus the minimum grain, then the process returns to the drawing process 72 where the object is drawn in step 134. If the left-edge of tmp does not fall within the left-edge of tmp's parent plus the minimum grain, then tmp is invisible and the process searches for other hidden objects within the vicinity of tmp in step 114.

A method has been disclosed for drawing objects ordered in a tree-like data structure by finding adjoining hidden objects. The present invention eliminates the need to check the size of all objects in the data structure, and therefore increases the drawing speed of the visualization tool. The increase in speed achieved varies depending on the size of the data structure, the order of magnitude in size differences among the objects in the data structure and the complexity of the drawing process. In some cases, the present invention may increase drawing speed by a factor of ten or higher. Software written according to the present invention is to be stored in some form of computer-readable medium, such as memory or CD-ROM.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for identifying invisible objects ordered in a tree-like data structure in which a drawing program displays object data on a display device and a user selects a viewing area of the object data to be drawn, wherein each of the objects includes a size that is determined by a first-edge value and a second-edge value, the method comprising the steps of:

(a) finding a maximum second-edge value among a group of objects that includes a first object and descendant objects of the first object;

(b) determining a viewing resolution from the viewing area;

(c) drawing each of the objects in the viewing area;

(d) if the first object is invisible at the viewing resolution, calculating from the maximum second-edge value whether any of the descendant objects are visible at the viewing resolution by calculating whether any of the descendant objects are visible when a right-most edge value minus a left-edge value of the first object is greater than the viewing resolution; and (e) if none of the descendant objects are visible, determining if there are more objects to be drawn within the viewing area, thereby eliminating the need to check the size of each of the descendant objects.

2. A method as in claim 1 wherein step (a) further includes the step of:

(a2) representing each of the objects as a data structure; and (a2) storing the maximum second-edge value in the data structure.

3. A method as in claim 2 wherein step (b) further includes the step of:

(b1) calculating which objects in the tree-like data structure fall within the viewing area.

4. A method as in claim 3 wherein step (c) further includes the step of:

(c1) drawing each of the objects by traversing the tree-like data structure first by depth and then right-to-left.

5. A method as in claim 1 wherein step (d) further includes the step of:

(d2) if a visible descendant object is found, drawing the visible descendant object.

6. A method as in claim 5 wherein step (d) further includes the step of:

(d3) if a visible descendant object is not found, determining the visibility of any sibling objects of the first object.

7. A method as in claim 6 wherein step (d) further includes the step of:

(d4) if the first object has no sibling objects, determining the visibility of any of ancestors of the first object.

8. A method as in claim 7 wherein step (d) further includes the step of:

(d5) if the first object has no sibling objects, determining the visibility of any of ancestors located to the right of the first object in the tree-like data structure.

9. A computer-readable medium containing program instructions for identifying invisible objects ordered in a tree-like data structure in which a drawing program displays object data on a display device and a user selects a viewing area of the object data to be drawn, wherein each of the objects includes a size that is determined by a first-edge value and a second-edge value, the program instructions for:

(a) finding a maximum second-edge value among a group of objects that includes a first object and descendant objects of the first object;

(b) determining a viewing resolution from the viewing area;

(c) drawing each of the objects in the viewing area;

(d) if the first object is invisible at the viewing resolution, calculating from the maximum second-edge value whether any of the descendant objects are visible at the viewing resolution by calculating whether any of the descendant objects are visible when a right-most edge value minus a left-edge value of the first object is greater than the viewing resolution; and (e) if none of the descendant objects are visible, determining if there are more objects to be drawn within the viewing areas thereby eliminating the need to check the size of each of the descendant objects.

10. A computer-readable medium as in claim 9 wherein instruction (a) further includes instructions for:

(a2) representing each of the objects as a data structure; and (a2) storing the maximum second-edge value in the data structure.

11. A computer-readable medium as in claim 10 wherein instruction (b) further includes instructions for:

(b1) calculating which objects in the tree-like data structure fall within the viewing area.

12. A computer-readable medium as in claim 11 wherein instruction (c) further includes instructions for:

(c1) drawing each of the objects by traversing the tree-like data structure first by depth and then right-to-left.

13. A computer-readable medium as in claim 9 wherein instruction (d) further includes instructions for:

(d2) if a visible descendant object is found, drawing the visible descendant object.

14. A computer-readable medium as in claim 13 wherein instruction (d) further includes instructions for:

(d3) if a visible descendant object is not found, determining the visibility of any sibling objects of the first object.

15. A computer-readable medium as in claim 14 wherein instruction (d) further includes instructions for:

(d4) if the first object has no sibling objects, determining the visibility of any of ancestors of the first object.

16. A computer-readable medium as in claim 15 wherein instruction (d) further includes instructions for:

(d5) if the first object has no sibling objects, determining the visibility of any of ancestors located to the right of the first object in the tree-like data structure.

* * * * *